UNITED STATES PATENT OFFICE.

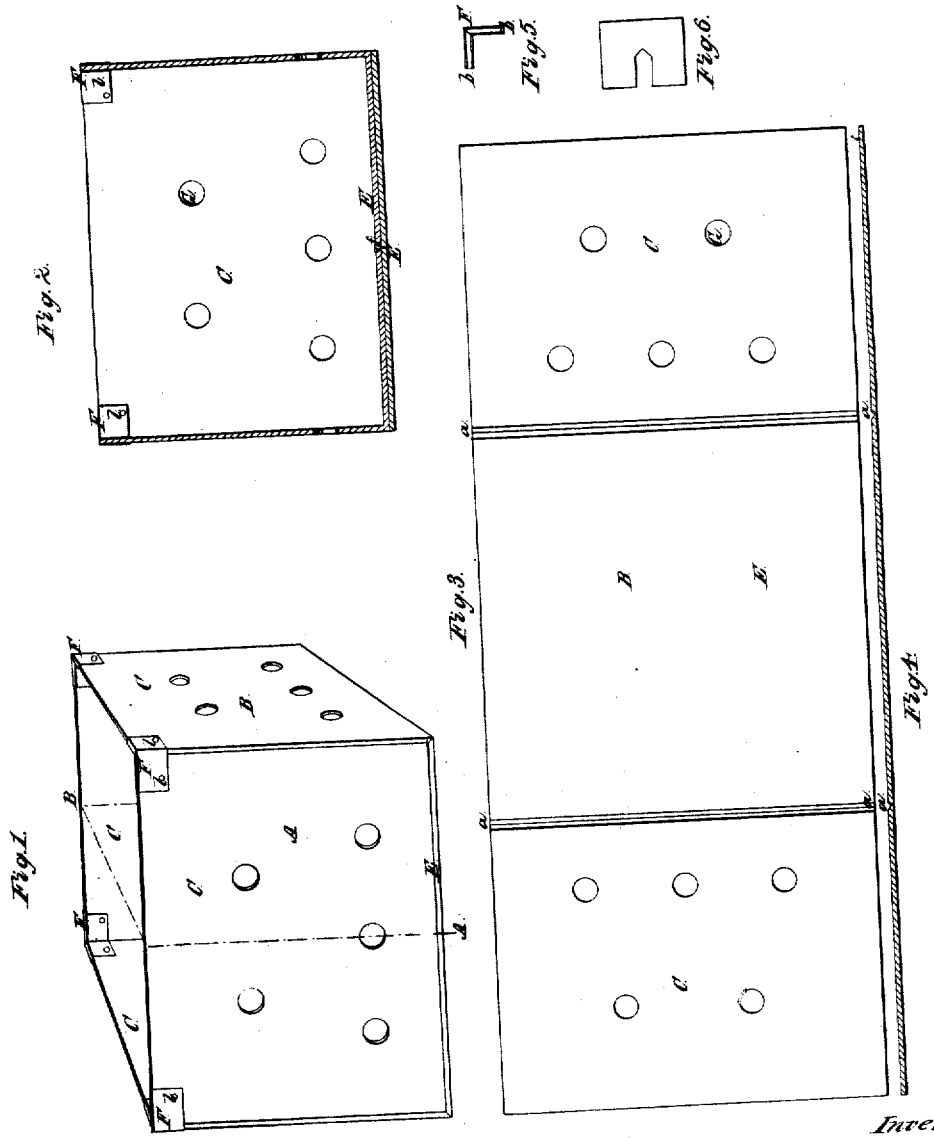

W. H. EARLE, OF VINELAND, NEW JERSEY, ASSIGNOR TO HIMSELF AND G. M. BUTTRICK, OF BARRE, MASSACHUSETTS.

IMPROVEMENT IN FRUIT-BOXES.

Specification forming part of Letters Patent No. 58,939, dated October 16, 1866.

*To all whom it may concern:*

Be it known that I, WILLIAM H. EARLE, of Vineland, New Jersey, have invented a new and useful Improvement in the Mode of Making Fruit-Boxes; and I do hereby declare that the following is a full, clear, and exact description of the same, reference being had to the accompanying drawings, forming a part of this specification, in which—

Figure 1 represents a perspective view of my improved fruit-box. Fig. 2 represents a cross-section on line A B, Fig. 1. Figs. 3, 4, 5, and 6 represent detached parts hereinafter to be referred to.

To enable those skilled in the art to which my invention belongs to make and use the same, I will proceed to describe it.

The box is made from two strips of thin boards, A and B. One strip, B, is shown spread out in Fig. 3. The strips are cut out of the desired length and width; then two V-shaped grooves, a, are cut out crosswise. The wings C of each strip are then turned up at right angles to the middle piece, E, when one of the middle pieces, E, is placed upon the other, and a box is formed having a double bottom, as indicated in Figs. 1 and 2, the four wings C forming the four sides of the box and the middle pieces, E, the double bottom. All that now remains is to fasten the wings C, which form the sides of the box, together. This I effect by a simple and cheap metal corner-piece, F. (Shown in Fig. 5.) This fastening can be made from tin, first cut up into pieces, as shown in Fig. 6, and then bent into the shape shown in Fig. 5, with the spaces b at right angles to each other, to receive and fit the corners of the boxes, as shown in Fig. 1. To secure the fastenings F securely in place, the metal is punched or pricked into the wood, as indicated at c. This indentation may be made upon the inside as well as the outside, if desired.

Air and ventilating holes G may be made in the sides of the boxes.

It will be noticed that the strips must be so cut that when applied together, as shown and described, the wings of one will fit in between those of the other, and also be even at the top.

My improved box can be made quite quickly, is simple and cheap, and at the same time light and strong.

The double bottom protects the fruit from dampness, and thus prevents decay and rotting in transportation to market and when stored for use.

Again, the parts of the boxes can be packed in a compact manner when being sent from the manufactory to the fruit grower or dealer, and by him put together without trouble.

When the market season is over, the fastenings may be removed and the two pieces or strips A and B spread out in a horizontal position, as shown in Fig. 3, and then packed so as to avoid dust and injury.

In taking the boxes apart no nails or screws have to be removed. The nail $f$ in the bottom is the pivot on which the pieces A and B turn when packed.

Having described my improved fruit-box, what I claim therein as new and of my invention, and desire to secure by Letters Patent, is—

The combination, with the upper corners of a box, the sides and bottom of which are made as described, of the metal corner-fastening pieces F, substantially as shown and described.

WM. H. EARLE.

Witnesses:
W. A. HOUSE,
F. G. CHUBBUCK.